2,800,498
CARBAMATES OF DIALKYLAMINOALKYL p-AMINOBENZOATES

Pierre Chabrier, Paris, René Giudicelli, Fontenay-sous-Bois, and Henry Najer, Paris, France, assignors to Les Laboratoires Dausse (Société Anonyme), Paris, France, a French company, and Recherches et Techniques Appliquees (Société Anonyme), Ain-es-Sebaa, Morocco, a company of Morocco, jointly No Drawing. Application September 12, 1955,
Serial No. 533,895

Claims priority, application France September 12, 1954

1 Claim. (Cl. 260—472)

This invention relates to new benzoic acid derivatives and to processes for their preparation.

Compounds previously employed as local anaesthetics include inter alia esters of para-aminobenzoic acid with certain lower aliphatic alcohols containing a tertiary amine group. These esters are administered in the form of salts, generally in the form of hydrochlorides. In addition, for the therapeutic treatment of cardiacal arrythmia or tachycardia there have been employed amides of para-aminobenzoic acid in which a hydrogen atom attached to the nitrogen atom of the amido group is substituted by an aliphatic radical containing a tertiary amine group, such amides possessing a very weak local anaesthetic action.

The present applicants have found by research and experimentation that by converting the para-amino group of the aforesaid esters and amides into a urethane group the local anaesthetic activity of resultant salts, more especially the hydrochlorides, is considerably enhanced.

The new benzoic acid derivatives of the present invention are these containing structure:

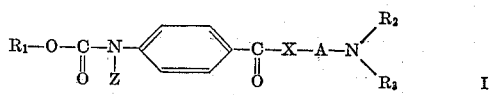

including not only the bases conforming to this formula but also the corresponding acid addition and quaternary ammonium salts, wherein $R_1$ represents an alkyl or alkylene group which may be unsubstituted or substituted by, for example, a phenyl group or a chlorine atom, X represents an oxygen atom or the group —NH—, A represents a saturated straight or branched divalent aliphatic hydrocarbon radical containing at least 2 carbon atoms. $R_2$ and $R_3$ each represent a lower alkyl group or $R_2$ and $R_3$ together with the nitrogen atom to which they are attached represent a heterocyclic nucleus and Z represents a hydrogen atom or an organic substituent such as a lower alkyl group. Especially important salts are the hydrochlorides.

The more important of the compounds of the invention are those of the aforesaid general formula in which:

(a) X represents an oxygen atom, A represents —CH₂CH₂—, $R_2$ and $R_3$ each represent an ethyl group, Z represents a hydrogen atom and $R_1$ represents methyl, ethyl, β-chloroethyl, isopropyl, butyl, isobutyl, pentyl, hexyl or benzyl, (b) X represents an oxygen atom, A represents —CH₂CH₂CH₂—, $R_2$ and $R_3$ each represent a butyl group, Z represents a hydrogen atom and $R_1$ represents methyl, ethyl, β-chloroethyl, butyl, isobutyl, pentyl, hexyl or benzyl, (c) X represents the group —NH—, A represents —CH₂CH₂—, $R_2$ and $R_3$ each represent an ethyl group, Z represents a hydrogen atom and $R_1$ represents methyl, ethyl, β-chloroethyl, butyl, isobutyl or benzyl.

Outstanding important compounds for therapeutic application are, however, those compounds of type (a) in which $R_1$ represents butyl, isobutyl, or benzyl (i. e. β-diethylaminoethyl p-(butoxy-, isobutoxy- and benzyloxycarbonylamino) benzoates) and those compounds of type (b) in which $R_1$ represents butyl, isobutyl or benzyl (i. e. γ-dibutylaminopropyl p-(butoxy-, isobutoxy and benzyloxycarbonylamino) benzoates), these compounds having, in the form of the hydrochlorides, local anaesthetic activity 5 to 20 times greater, depending on the circumstances, as measured by Regnier's test on the cornea of the rabbit, than that of the corresponding benzoic acid derivative containing no urethane group. In addition, other compounds of particular importance are the amides of type (c) in which $R_1$ represents butyl or benzyl (i.e. β-diethylaminoethylamides of p-(butoxy- and benzyloxy-carbonylamino) benzoic acids), which have greater local anaesthetic activity than procaine i. e. β-diethylaminoethyl p-aminobenzoate, while the procaine amides from which they are derived almost entirely lack such activity.

Generally speaking, the hydrochlorides are crystalline, white compounds having a definite melting point. Those derived from procaine hydrochloride by replacement of the para-amino group by the $R_1OOCNH$-group have a solubility in water and in alcohol which increases with the number of carbon atoms in the $R_1$ radical. Thus, when $R_1$ represents methyl, the compound is substantially insoluble in water and in alcohol, while the compound in which $R_1$ represents hexyl is soluble in water and in alcohol in all proportions. Those derived from "Butelline" (i. e. β-dibutylamino-propyl p-aminobenzoate) hydrochloride are sparingly soluble in cold water and very soluble in hot water. Finally, in the case of hydrochlorides similarly derived from procaine amide (β-diethyl-aminoethylamide of p-aminobenzoic acid) hydrochloride, the water-solubility, which is very low when $R_1$ represents methyl, increases rapidly with the number of carbon atoms in the radical $R_1$.

In the case of the last-mentioned compounds containing an urethane group, a remarkable feature is that the local anaesthetic activity reverts to values at least equal to and generally higher than that of procaine, the local anaesthetic activity of which is very considerably decreased when it is converted into procaine amide.

According to a feature of the present invention a process for the preparation of the hydrochlorides of the new derivatives of general Formula I comprises reacting in aqueous solution a chlorocarbonate of the general formula

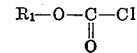

(wherein $R_1$ is as hereinbefore defined) with a water-soluble salt, preferably the hydrochloride or the sulphate, of a base of the general formula:

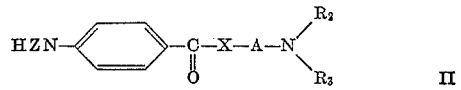

(wherein X, A, $R_2$, $R_3$ and Z are as hereinbefore defined) and separating from the reaction mixture the hydrochloride thus formed. In a modification of this process, the reaction may be carried out in an inert organic solvent, such as benzene.

According to a further feature of the present invention, the new derivatives of general Formula I are prepared by reacting a chlorocarbonate of the general formula

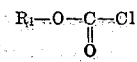

(wherein $R_1$ is as hereinbefore defined) with a para-aminobenzoic acid of the formula:

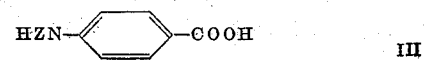

(wherein Z is as hereinbefore defined) and the —COOH group in the product obtained of the general formula:

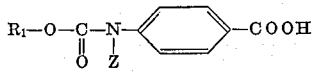

is converted by known methods into the grouping

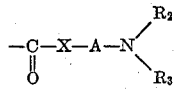

(wherein X, A, $R_2$ and $R_3$ are as hereinbefore defined).

Yet still a further feature of the present invention for the preparation of the new derivatives of general Formula I comprises converting by known method the HZN- group in a base of the general formula:

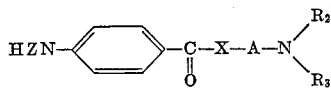

(wherein Z, X, A, $R_2$ and $R_3$ are as hereinbefore defined) into an isocyanate group and reacting the phenyl isocyanate thus obtained with an alcohol $R_1OH$ (wherein $R_1$ is as hereinbefore defined).

By the expression "known methods" as used in this specification and accompanying claim is meant methods heretofore used or described in the chemical literature. In any of the aforesaid processes, a hydrochloride salt obtained as final product may be converted into the corresponding base by treatment with, for example, sodium carbonate. Such hydrochlorides may also be converted into salts of other acids by methods known per se.

The following examples illustrate the invention.

Example I

To a solution of 11 g. (0.04 gram mole) of procaine hydrochloride in 40 cc. of water heated to 45°–50° C. are added 5.5 g. (0.04 gram-mole) of butyl chlorocarbonate, and the solution obtained is mechanically agitated for two hours. The limpid solution is then left in a refrigerator for two hours and a crystalline white precipitate forms. After filtering, washing with water and drying over phosphoric anhydride, 12.6 g. of a white crystalline compound, which melts at 157° C. after a single recrystallisation from water, is obtained. The compound is β-diethylaminoethyl p-butoxycarbonyl-amino-benzoate hydrochloride.

*Analysis.*—Cl calculated=9.53%. Cl found=9.29%.

Example II

To a solution of 7.1 g. (0.01 gram-mole) of "Butelline" sulphate in 30 cc. of water heated to 50° C. are added 1.9 g. (0.02 gram-mole) of methyl chlorocarbonate, and the mixture is mechanically agitated for two hours (a white precipitate forms after 20 minutes agitation). The reaction mixture is then left for one hour in a refrigerator. The precipitate formed is filtered off, washed with water and dried over phosphoric anhydride. 7.1 g. of a slightly yellowish crystalline compound, which melts at 179° C. after a single recrystallisation from water, is obtained. The compound is γ-dibutylaminopropyl p methoxycarbonylaminobenzoate hydrochloride.

*Analysis.*—Cl calculated=8.86%. Cl found=8.9%.

The hydrochloric acid evolved in the course of the reaction displaces the sulphuric acid by a double-decomposition reaction, the hydrochloride of the product being very sparingly soluble in cold water while the sulphate is very water-soluble.

Example III

To a solution of 2.75 g. (0.01 gram-mole) of procainamide hydrochloride in 15 cc. of water heated to 50° C. are added 1.5 g. (0.01 gram-mole) of β-chloroethyl chlorocarbonate, and the solution is mechanically agitated for two and a half hours. The solution, which becomes limpid, is left for two hours in a refrigerator; no precipitate forms. The water is then driven off in vacuo over a water bath. The residual oil, when triturated in a few ccs. of absolute alcohol, forms a white crystalline mass. The mass is filtered, washed with alcohol and dried over phosphoric anhydride. There is thus obtained 2.7 g. of p- (β - chloroethoxycarbonylamino) - N - (β-diethylaminoethyl)benzamide hydrochloride, which melts at 154° C. after a single recrystallisation from absolute alcohol.

*Analysis.*—Cl (ionisable calculated)=9.64%. Cl (ionisable found)=9.53%.

In a similar manner there may be prepared the hydrochlorides of the compounds listed in the following table in which the various symbols, referring to general Formula I, are as indicated. In each case the Z substituent is a hydrogen atom.

| $R_1$ | X | A | $R_2=R_3$ | Melting point in °C. |
|---|---|---|---|---|
| —$CH_3$ | —O— | —$CH_2.CH_2$— | —$C_2H_5$ | 199 |
| —$CH_2.CH_3$ | —O— | —$CH_2.CH_2$— | —$C_2H_5$ | 171 |
| —$CH_2.CH_2Cl$ | —O— | —$CH_2.CH_2$— | —$C_2H_5$ | 159 |
| —$(CH_2)_3CH_3$ | —O— | —$CH_2.CH_2$— | —$C_2H_5$ | 157 |
| —$CH_2.CH(CH_3)_2$ | —O— | —$CH_2.CH_2$— | —$C_2H_5$ | 144 |
| —$(CH_2)_4.CH_3$ | —O— | —$CH_2.CH_2$— | —$C_2H_5$ | 144 |
| —$(CH_2)_5.CH_3$ | —O— | —$CH_2.CH_2$— | —$C_2H_5$ | 133 |
| —$CH_2.C_6H_5$ | —O— | —$CH_2.CH_2$— | —$C_2H_5$ | 158 |
| —$CH_3$ | —O— | —$CH_2.CH_2.CH_2$— | —$C_4H_9$ | 179 |
| —$CH_2.CH_3$ | —O— | —$CH_2.CH_2.CH_2$— | —$C_4H_9$ | 154-155 |
| —$CH_2.CH_2Cl$ | —O— | —$CH_2.CH_2.CH_2$— | —$C_4H_9$ | 147 |
| —$(CH_2)_3CH_3$ | —O— | —$CH_2.CH_2.CH_2$— | —$C_4H_9$ | 152 |
| —$CH_2.CH(CH_3)_2$ | —O— | —$CH_2.CH_2.CH_2$— | —$C_4H_9$ | 163 |
| —$(CH_2)_4.CH_3$ | —O— | —$CH_2.CH_2.CH_2$— | —$C_4H_9$ | 145 |
| —$(CH_2)_5.CH_3$ | —O— | —$CH_2.CH_2.CH_2$— | —$C_4H_9$ | 129 |
| —$CH_2.C_6H_5$ | —O— | —$CH_2.CH_2.CH_2$— | —$C_4H_9$ | 131 |
| —$CH_3$ | —NH— | —$CH_2.CH_2$— | —$C_2H_5$ | 223 |
| —$CH_2.CH_3$ | —NH— | —$CH_2.CH_2$— | —$C_2H_5$ | 174-175 |
| —$CH_2.CH_2Cl$ | —NH— | —$CH_2.CH_2$— | —$C_2H_5$ | 154 |
| —$(CH_2)_3.CH_3$ | —NH— | —$CH_2.CH_2$— | —$C_2H_5$ | 144 |
| —$CH_2.CH(CH_3)_2$ | —NH— | —$CH_2.CH_2$— | —$C_2H_5$ | 157 |
| —$CH_2.C_6H_5$ | —NH— | —$CH_2.CH_2$— | —$C_2H_5$ | 173-174 |

It is possible to liberate the bases from the hydrochlorides, for example by treatment with sodium carbonate, but the bases take the form of non-distillable products.

We claim:

A member of the class consisting of β-diethylaminoethyl p-(isobutoxy-carbonylamino)-benzoate and the hydrochloride thereof.

References Cited in the file of this patent

UNITED STATES PATENTS 2,681,925   Rabjohn _____ June 22, 1954

FOREIGN PATENTS 579,203   France _____ July 26, 1924